United States Patent [19]

Immeyer et al.

[11] 4,437,432
[45] Mar. 20, 1984

[54] BIRD-FEEDING MEMBER

[75] Inventors: Fritz H. Immeyer, Hamburg; Michael Wesche, Reinbek, both of Fed. Rep. of Germany

[73] Assignee: Dr. Immeyer GmbH, Hamburg, Fed. Rep. of Germany

[21] Appl. No.: 302,385

[22] Filed: Sep. 15, 1981

[30] Foreign Application Priority Data

Sep. 16, 1980 [DE] Fed. Rep. of Germany ....... 3034875
Aug. 25, 1981 [DE] Fed. Rep. of Germany ... 8124828[U]

[51] Int. Cl.³ ............................................. A01K 39/01
[52] U.S. Cl. .................................... 119/18; 119/51 R
[58] Field of Search ................... 119/51 R, 24, 26, 18; 248/339, 340, 341, 322; 223/87, DIG. 1; 24/DIG. 11

[56] References Cited

U.S. PATENT DOCUMENTS

| D. 167,326 | 7/1952 | Verosub et al. | 119/26 |
| 270,071 | 1/1883 | Ireland | 119/18 |
| 966,364 | 8/1910 | Schmidt | 248/339 |
| 1,559,247 | 10/1925 | Graton | 40/107 |
| 1,786,777 | 12/1930 | Pfeiffer | 119/51 R |
| 1,843,864 | 2/1932 | Burnett | 119/18 |
| 1,979,057 | 10/1934 | Tomlinson | 119/18 |
| 1,990,712 | 2/1935 | Rose | 119/18 |
| 2,235,959 | 3/1941 | Copeman | 119/51 R |
| 2,264,957 | 12/1941 | Shafarman | 223/87 |
| 2,380,124 | 7/1945 | Streuli | 248/340 |
| 2,661,719 | 12/1953 | Scheidt et al. | 119/51 R |
| 2,709,985 | 6/1955 | Clauson | 119/51 R |
| 3,032,242 | 5/1962 | Roberts | 223/87 |
| 3,094,100 | 6/1963 | Wise | 119/51 R |
| 3,122,129 | 2/1964 | Wise | 119/51 R |
| 3,140,692 | 7/1964 | Beyeg | 119/51 R |
| 3,215,385 | 11/1965 | Rockland | 248/339 |
| 3,323,770 | 6/1967 | Wolar | 248/339 |
| 3,458,093 | 7/1969 | Bacharch | 223/87 |
| 3,727,869 | 4/1973 | Flubacker | 248/359 |
| 3,859,856 | 1/1975 | Keele et al. | 374/160 |
| 3,870,267 | 3/1975 | Okle | 248/339 |
| 3,885,768 | 4/1975 | Frye | 24/DIG. 11 |
| 4,062,289 | 12/1977 | McNair | 248/359 |
| 4,113,109 | 9/1978 | Donnelli et al. | 248/360 |

FOREIGN PATENT DOCUMENTS

| 561046 | 5/1960 | Belgium | 223/DIG. 1 |
| 2133785 | 1/1973 | Fed. Rep. of Germany | 248/360 |
| 770313 | 6/1934 | France | 119/18 |
| 6708663 | 6/1968 | Netherlands | 223/87 |

Primary Examiner—Gene Mancene
Assistant Examiner—David I. Tarnoff
Attorney, Agent, or Firm—Toren, McGeady and Stanger

[57] ABSTRACT

A bird-feeding member comprising a supporting and retaining member and a quantity of birdseed which is retained thereon and held together by a bonding agent, the supporting and retaining member consisting of a strip-shaped blank of pasteboard, cardboard or the like of rectangular, square or some other geometrical shape while the birdseed member retained on the supporting and retaining member takes the form of a block.

6 Claims, 24 Drawing Figures

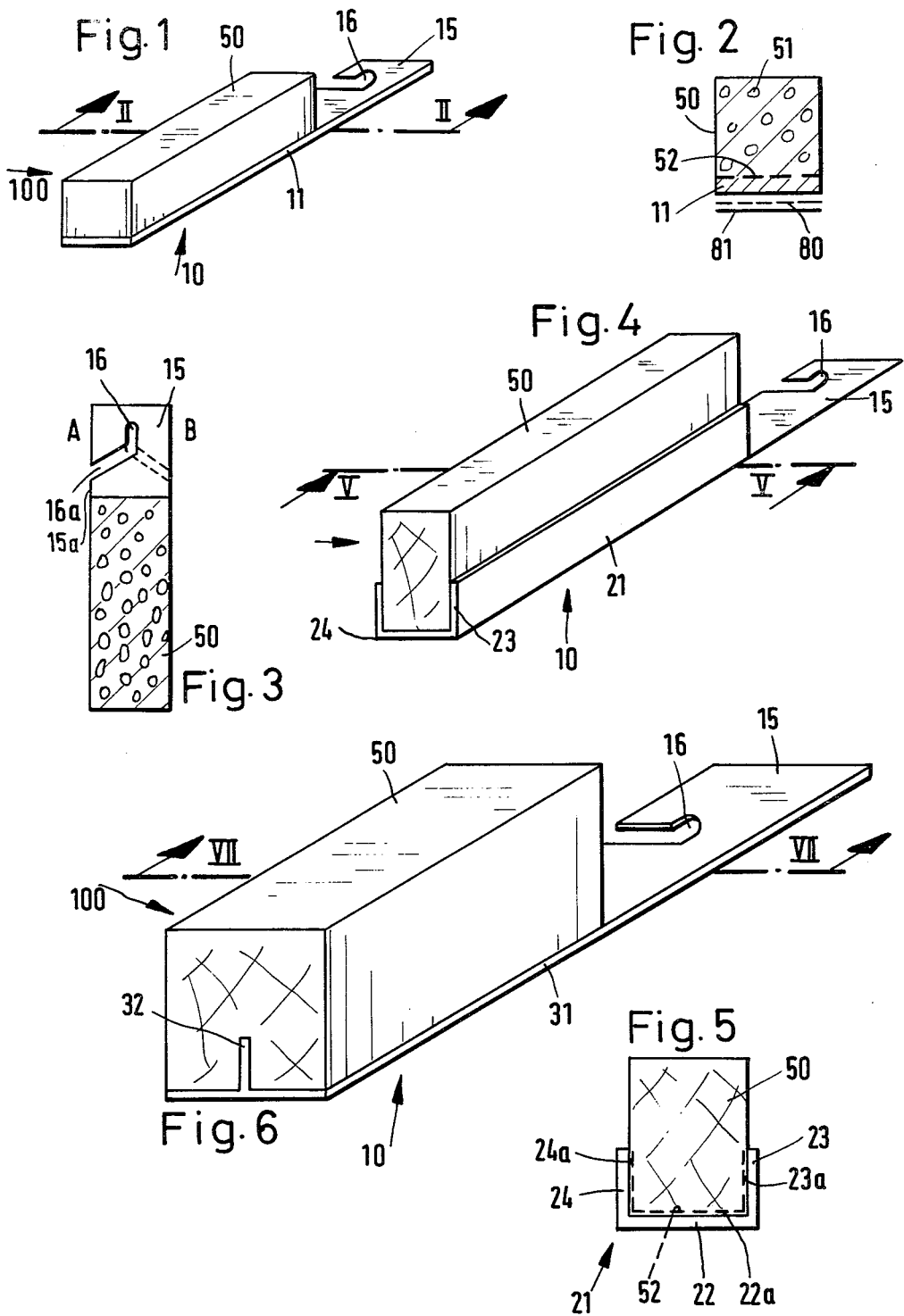

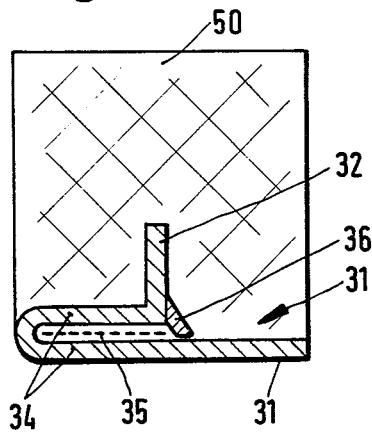
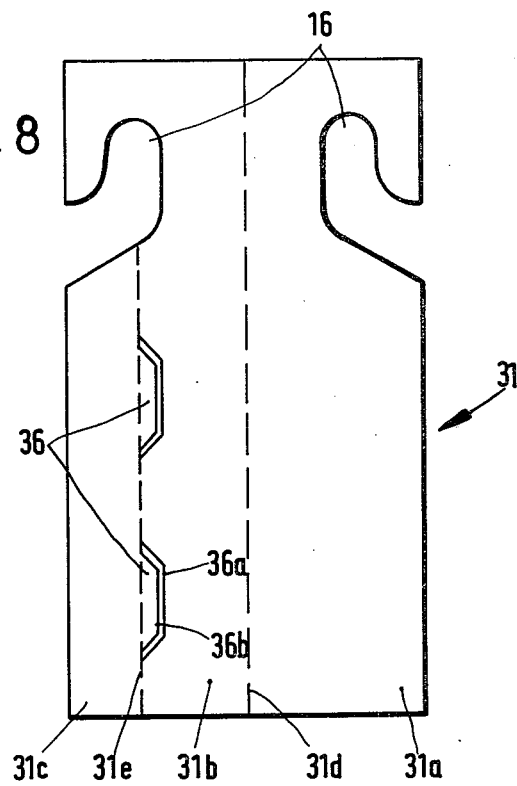
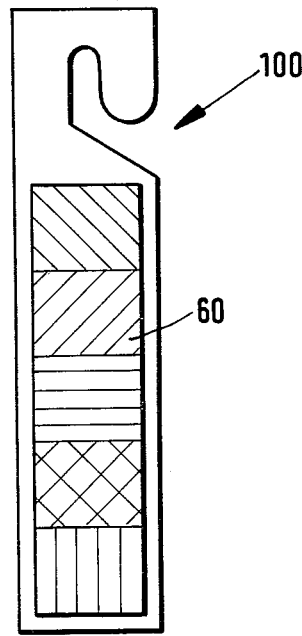
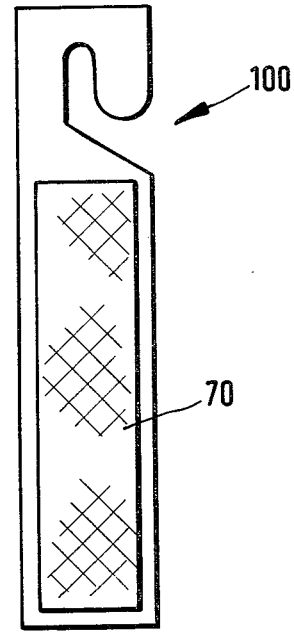

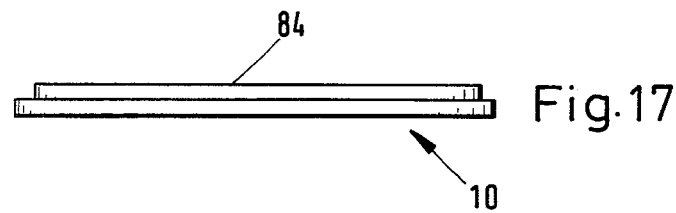
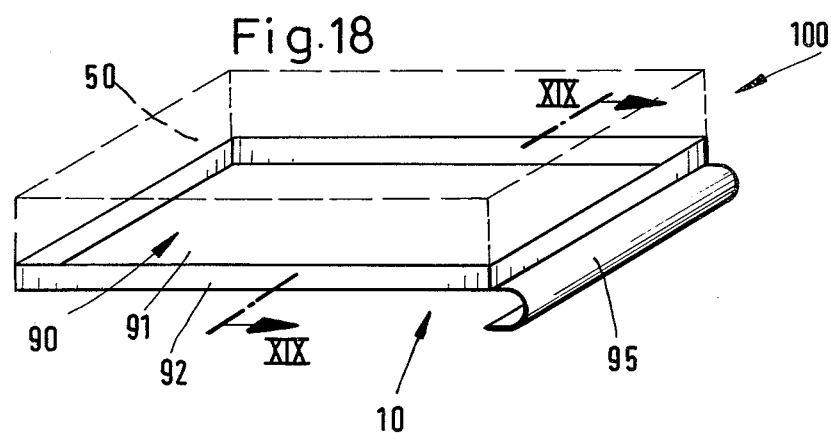
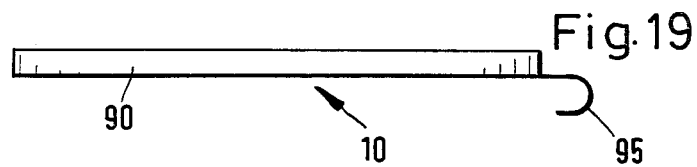
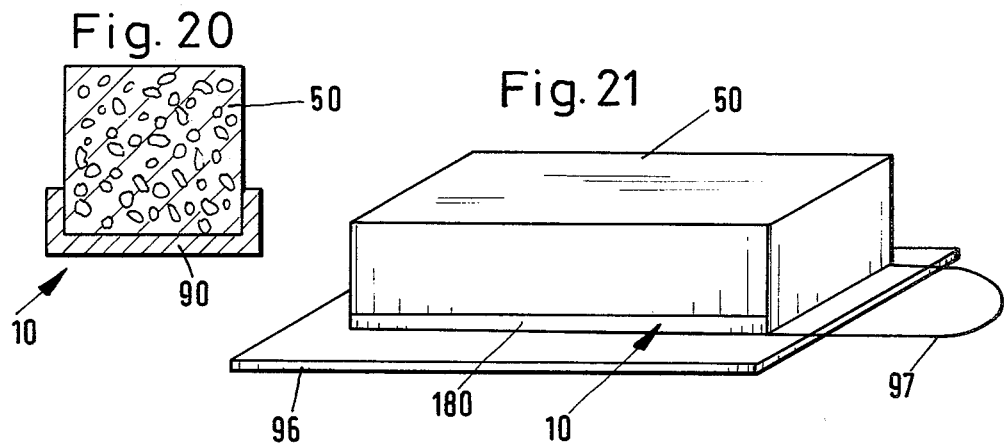

BIRD-FEEDING MEMBER

The invention relates to a bird-feeding member comprising a supporting and retaining member and a quantity of birdseed which is retained thereon and held together by a bonding agent.

Very many constructions of bird-feeding members for cage birds are known. They consist of a supporting core such as, for example, a bar of wood with an attaching wire or the like, and a core-enclosing sleeve of granular food, such a millet, or the like which is held together by a bonding agent. In one known construction the core of the bird-feeding member consists of a rod of flat, rectangular or substantially rectangular cross-section, the birdseed sleeve having a correspondingly flattened cross-sectional shape which gives the bird-feeding member the appearance of a long, rectangular biscuit, known in German as a "Printe". This bird-feeding member also has a bar-shaped core and a birdseed sleeve enclosing the core, so that the bird-feeding member can be disposed only freely suspended in cages, and therefore the bird can peck the seeds off the bird-feeding member on all sides. If, in contrast, that bird-feeding member is attached to the bars of a cage sidewall the bird can remove the seeds only on one side, so that the bird-feeding member often has to be turned round. Another disadvantage of such a bird-feeding member is that the birdseed sleeve does not adhere adequately to the core, so that relatively large quantities of stuck-together birdseeds may become released from the core, with the consequence that a relatively large percentage of the birdseed lies around in the cage and is seldom picked up by the bird (German Utility Model No. 753,559).

Various forms of pressed members for birdseed are also known which have merely a suspension device but no core. However, such bird-feeding members can be made only in small dimensions, and not in the form of block shaped or rod-shaped bird-feeding members, since the birdseed held together by the bonding agent used lacks the adequate strength for making bar-shaped bird-feeding members.

A block-like bird-feeding member is also known which consists of seeds specific to the species of birds and additives, such as vitamins, minerals or the like, the seeds being connected to one another by a bonding agent, namely water glass (German Utility Model No. 7,917,069).

Block-like and bar-like bird-feeding members which consist of a core and a core-enclosing sleeve of birdseed held together by means of a bonding agent can be produced only by the immersion process. Such a process is wage-intensive and time-wasting. When working with moulds, in contrast, retaining means must be provided by means of which the core is retained at a distance in the mould, so that the sleeve of birdseed can be applied to the core. There is also the point that such bird-feeding members having a core-enclosing birdseed sleeve have no surfaces which can carry advertising material or other devices specific to the bird.

In contrast, it is an object of the invention to provide a bird-feeding member which can be readily and cheaply produced, whose supporting and retaining member has large adhesive surfaces and a high adhesive capacity for the birdseed member applied like a block, and which has large surfaces for advertising purposes and for the positioning of additional devices, such as mirror surfaces or the like, and which enables the bird to peck the seeds off in a manner suited to its beak to the very last seed, without seeds crumbling and dropping off so that they cannot be used.

To solve this problem, the invention provides a bird-feeding member of the kind specified at the outset, wherein the bird-feeding member consists of a supporting and retaining member of a strip-shaped blank of pasteboard, cardboard, wood, plastics or the like of rectangular, square, oval shape, or in the form of a circle, triangle, heart or some other geometrical shape, a block-like birdseed member being retained on the supporting and retaining member by means of the bonding agent holding the seeds together.

In the basic embodiment of the invention the blank forming the supporting and retaining member can take the form of a flat member. The invention provides a variant embodiment wherein the supporting and retaining member consists of a strip-shaped, U-shaped blank with laterally upwardly folded edge portions of pasteboard, cardboard or the like which extend in the longitudinal direction of the blank, the birdseed member being retained on the inside wall surfaces of the blank by means of the bonding agent which holds the seeds together. In contrast, the invention provides a third embodiment wherein the supporting and retaining member consists of a strip-shaped, T-shaped blank of pasteboard, cardboard or the like with a perpendicular web, more particularly a central web which extends in the longitudinal direction of the blank, the birdseed member being retained on the flange-like portions and the two sidewall surfaces of the web of the blank by means of its bonding agent which holds the seeds together.

The latter embodiment has large adhesive surfaces for the birdseed member, so that the birdseed held together by means of the bonding agent is retained firmly adhering to the supporting surfaces of a supporting and retaining member thus constructed.

The cost-saving production of a bird-feeding member of this kind is particularly advantageous, since no core or core-enclosing birdseed sleeve is used.

The block-like bird-feeding member is placed on the strip-shaped blank on one side, the bird-feeding member adhering to the blank by means of the bonding agent which holds the birdseed together. There is therefore no need to carry out a special operation in order to attach a prefabricated bird-feeding member to the blank by means of special adhesive connections. The strip-shaped blank forming the supporting and retaining member is merely laid in a mould, and then the mixture of birdseed and bonding agent is poured into the mould. After the bonding agent has set, i.e. solidified, the simultaneously formed bird-feeding member is retained firmly on the supporting and retaining member after demoulding. The feature that a blank of U- or T-shaped section provides large bearing surfaces for the bird-feeding member ensures that the latter adheres satisfactorily to the supporting and retaining member. There is no need for the special preparation, manufacture and storage of cores, as with the known bird-feeding members. The blanks of pasteboard, cardboard or the like used for making the supporting and retaining member can be stored having regard to the size of the bird-feeding members to be produced. However, the size of the blanks to be used can also be adapted to the size of the particular bird-feeding members to be made, without the need for any special operation; all that is done is to cut out strips of pasteboard, cardboard or the like of suitable dimensions.

Due to the feature that the supporting and retaining member has a bird-feeding member on only one side, the outer surface of the supporting and retaining member is available for the application of publicity material and, for instance, a thermometer or mirror surface.

Further advantageous features of the invention can be gathered from the subclaims; very advantageously the web of the T-shaped blank has at least one web reinforcing and supporting strap which can be folded upwards when the web is folded perpendicularly upwards, giving the web considerable stability, so that the bird-feeding member applied to the blank acquires a high inherent rigidity which enables very long bar-shaped bird-feeding members to be produced.

The invention also provides the use of a block-like birdseed member, which is retained adhesively by means of the birdseed bonding agent on a strip-shaped supporting and retaining member of pasteboard, cardboard or the like with large adhesive and bearing surfaces, the birdseed member consisting of birdseed, held together by means of a bonding agent, as a cheaply manufacturable bird-feeding member which can be used in cages to enable the bird to remove the birdseed in a manner suited to its beak and to prevent the seeds from dropping.

Embodiments of the invention are illustrated in the drawings, wherein:

FIG. 1 is a view diagrammatically illustrating a bird-feeding member consisting of a strip-shaped cardboard blank with a birdseed member applied thereto.

FIG. 2 is a vertical section, taken along line II—II of FIG. 1.

FIG. 3 is a plan view of the bird-feeding member illustrated in FIG. 1.

FIG. 4 is a view diagrammatically illustrating a variant embodiment of a bird-feeding member comprising a U-shaped blank with a birdseed member applied thereto.

FIG. 5 is a vertical section, taken along the line V—V in FIG. 4.

FIG. 6 is a view diagrammatically illustrating a bird-feeding member having a T-shaped blank as the supporting and retaining member.

FIG. 7 is a vertical section, taken along the line VII—VII in FIG. 6.

FIG. 8 is a plan view of a folded-open blank of a supporting and retaining member having a T-shaped cross-section.

FIG. 9 is a rear view of a bird-feeding member having a temperature indicating device disposed on the outside surface of the supporting and retaining member.

FIG. 10 is a rear view of a bird-feeding member having a mirror surface disposed on the outer wall surface of the supporting and retaining member.

FIG. 17 is a side view of the supporting and retaining member illustrated in FIG. 16.

FIG. 18 is a diagrammatic view of a dish-shaped supporting and retaining member with a birdseed member.

FIG. 19 is a side view of the supporting and retaining member illustrated in FIG. 18.

FIG. 20 is a vertical section, to an enlarged scale, taken along the line XX—XX in FIG. 18.

FIG. 21 illustrates diagrammatically an embodiment of a bird-feeding member with an additionally reinforced, flat supporting and retaining member.

Figure 11:
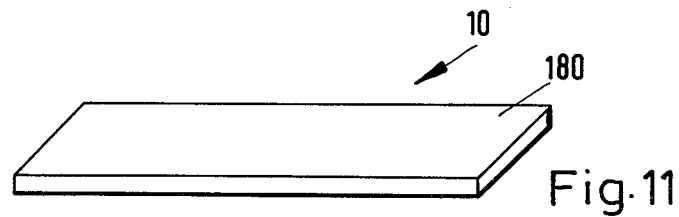
FIG. 11 is a diagrammatic view of a supporting and retaining member comprising a flat blank.

A bird-feeding member 100, illustrated in FIGS. 1, 4 and 6 consists of a supporting and retaining member 10, which can have differently constructed cross-sectional profiles, and a birdseed member 50, which is retained by gluing on the supporting and retaining member 10 and whose seeds 51, are held together in a block by means of a bonding agent 52.

In the embodiments illustrated in FIGS. 1, 2 the supporting and retaining member consists of a flat, strip-shaped blank 11 of cardboard, pasteboard, wood, plastics or the like. Glued to the blank 11 is the birdseed member 50; the adhesive connection between the birdseed member 50 and the blank 11 is produced by means of the bonding agent 52, holding the seeds 51 together.

The blank 11 has a birdseed member 50 on one side only. The rear wall surface 11a of the blank 11 is available to take publicity material, or the like.

The blank 11 can be of any required size in accordance with the size of the particular required birdseed member 50. The birdseed member 50 is so attached to the blank 11 that the latter has a strap-shaped portion 15 which is free from the birdseed member and has a latching eyelet 16 which will be described in greater detail hereinafter (FIG. 3).

In a variant embodiment (FIGS. 4 and 5), to increase the adhesion surface for the birdseed member 50 on the supporting and retaining member 10, the latter consists of a strip-shaped, U-shaped blank 21 with web 22, edge portions 23 and 24 being bent upwards perpendicularly. The birdseed member 50 is retained on the U-shaped blank 21 on its web 22 between the two edge portions 23, 24, being retained adhesively on inner wall surfaces 22a, 23a and 24a formed by the blank 21 by means of the bonding agent 52, more particularly due to the upwardly folded edge portions 23, 24, the bearing surfaces for the birdseed member 50, on the blank 21 are increased in size, so that the birdseed member 50 is retained firmly on the blank 21. The blank 21 also has a strap-like portion 15, free from the birdseed member, for the formation of a latching eyelet 16. Similarly to the blank 11, the blank 21 is also made of cardboard, pasteboard or the like. The edge portions 23, 24 of the blank 21 are retained on its web 22, by the folding lines, which are folded upwards before the birdseed with the bonding agent is poured into the mould to produce the bird-feeding member.

The height of the edge portions 23, 24 correspond to substantially one third of the birdseed member 50 applied, so that the bird can peck off seeds at the sides also. Preferably, the height of the edge portions 23, 24 should not exceed half the height of the birdseed member 50.

In the embodiment illustrated in FIGS. 6 and 7 the inherent rigidity of the supporting and retaining member 10 is substantially further increased by the use of a blank 31 with a central web 32. The blank 31 is strip-shaped and T-shaped. Its web 32 is preferably disposed in the centre in relation to the two blank flanges 33, 34. The height of the web 32 corresponds to about half the height of the birdseed member 50.

The supporting and retaining member 10 with the T-shaped cross-sectional profile takes the form of a folding blank 31 which consists of a supporting basic portion 31a, a reinforcing portion 31b which is folded onto the basic portion 31a on one side and has a width corresponding to half the width of the basic portion 31a and is attached thereto by means of an adhesive connection 35 (FIG. 7), and a portion 31c which forms the web 32 and is folded at the free longitudinal edge of the reinforcing portion 31b (FIG. 8). To produce a supporting and retaining member 10 formed from such a folding blank, the reinforcing portion 31b is so bent around its folding line 31d that the reinforcing portion 31b comes to lie on the basic portion 31a and is retained thereon by means of the adhesive 35. The adhesive used can also be an adhesive glue or the like. Then the folding portion 31c forming the web 32 is so folded around its folding line 31e that it occupies a perpendicular position in relation to the basic portion 31a (FIGS. 7 and 8).

To enhance the inherent rigidity of the supporting and retaining member 10 consisting of the blank 31, the web 32 of the blank 31 is also further supported by means of straps 36. The web reinforcing and supporting straps 36 are folded on the folding portion 31c forming the web 32 in the folding line 31e, while the edge 36a bounding the strap 36 is punched out in the reinforcing portion 31b. Instead of a suitable punching-out, a perforated line can also be provided which must be released for the setting-up of the web 32. The straps 36 act as follows: when the folding portion 31c forming the web 32 is set up perpendicularly, the straps are also folded out of the folding portion plane 33b, so that the free edge 36b of each strap 36 can bear against the basic portion 31a, as shown in FIG. 7. Any required number of web reinforcing and supporting straps 36 can be used, the number merely being determined by the length of the particular blank 31 used:

To enable the bird-feeding member to be suspended in a bird cage in a versatile manner, the strap-shaped portion 15 of the blank 11; 21; 31 free from the birdseed member has a latching eyelet 16; to form the eyelet 16 a slot-shaped portion 16a extends from the lateral edge 15a of the blank about as far as the longitudinal centre of the blank and extends at an inclination in the direction of the free strap end. The slot-shaped portion 16a is adjoined by a slot-shaped portion 16b extending upwardly in the centre of the blank in the direction of the free strap end, the result being a latching eyelet 16 consisting of an introduction slot extending at an angle and adjoined by a slot which ensures secure retention. As the result of this special design of the latching eyelet 16 the bird-feeding member can readily be suspended from a bar of the bird cage; it can be attached not only to the bars forming the top cover of the bird cage, but also to horizontally extending bars of the cage sidewall in such a way that the birdseed member bears via its rear, free from the birdseed member, against the bars of the cage, so that the actual birdseed member 50 is freely available for the bird to take the birdseed. The latching eyelet 16 can be formed in the left-hand or right-hand side of the strap-shaped portion 15 of the blank 11; 21; 31, as shown at A B in FIG. 3 so that the birdseed member can always be attached to the most convenient place on the bird cage. Precisely the special design of the latching eyelet 16 not only enables the birdseed member to be readily suspended in a bird cage, but at the same time ensures that the suspended birdseed member is securely retained, since it cannot become detached or slide down, even if the bird causes the birdseed member to make strong, oscillatory movement as the bird is removing seed.

Due to the feature that the rear wall surface 11a of the blanks 11; 21; 31 is free from the birdseed member, the surface 11a can be used for the application of advertising material or the like.

However, the rear surface 11a is ideally suitable for the application to the blank of a strip-shaped temperature-indicating device 60 constructed in known manner, which indicates the actual temperature by a change in colour (FIG. 9). The birdseed member can also be combined with a mirror surface 70 attached to the free rear side 11a of the blank, so that even after all the birdseed has been removed the mirror surface of the bird-feeding member may be advantageously used, more particularly for budgerigars and the like.

To enable the bird-feeding member 100 to be unshiftably attached to a vertical wall or a horizontal surface, the rear wall 11a of the blank 11; 21; 31, free from the birdseed member, has an adhesive coating 80 which is covered by means of a pull-off protective sheet 81. Self-adhesive agents can be used as the adhesive coating 80. Constructing the bird-feeding member 100 with a self-adhesive layer enables the bird-feeding member to be attached unshiftably, for example, in aviaries and bird cotes set up in the open air, to prevent larger birds from knocking the bird-feeding member out of the aviary when they are removing seed or to prevent them from hacking off relatively large pieces of the birdseed member and flying off with them.

The blank 11 from which the supporting and retaining member 10 is made can have a rectangular, square or oval shape, or alternatively the form of a triangle, circle, heart, or some other geometrical shape.

Figure 12:
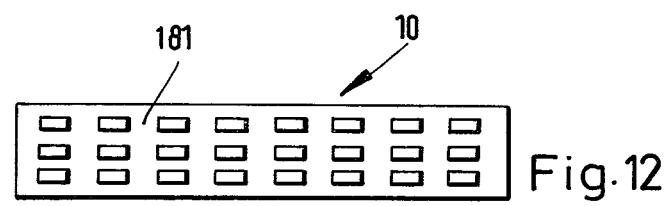
FIG. 12 is a plan view of a lattice-shaped supporting and retaining member.
Figure 13:
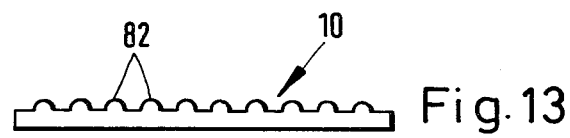
FIG. 13 is a side view of a supporting and retaining member having a birdseed member bearing surface formed with knobs.
Figure 14:
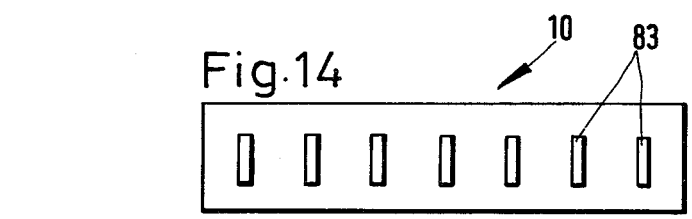
FIG. 14 is a plan view of a supporting and retaining member with retaining strips extending transversely of the member.
Figure 15:
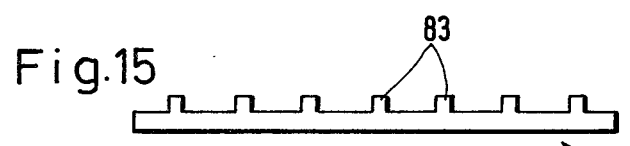
FIG. 15 is a side view of the supporting and retaining member illustrated in FIG. 14.
Figure 16:
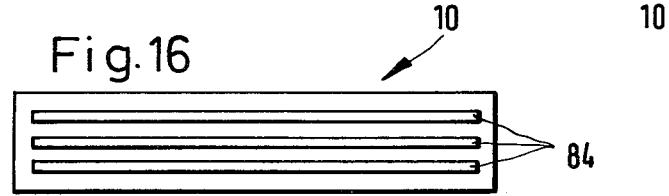
FIG. 16 is a plan view of a supporting and retaining member with retaining strips extending longitudinally of the member.

The supporting and retaining member 10 can consist of a flat blank 181 (FIG. 11). The supporting and retaining member 10 can also be constructed in the form of a lattice 181 (FIG. 12), or its bearing surface for the birdseed member 50 can be constructed with knobs. In the embodiment illustrated in FIG. 13 knobs have the reference 82. That side of the supporting and retaining member 10 for the birdseed member 50 can also bear retaining strips 83, 84 which extend transversely (FIGS. 14 and 15) or longitudinally (FIGS. 16 and 17) of the body respectively. The retaining strips 83, 84 are disposed or formed on the supporting and retaining member 10 if, for example, it is made of plastics.

The surface profiling of the supporting and retaining member 10 in the form of knobs 82, retaining strips 83 or 84, or a lattice-like construction of the blank 11 forming the supporting and retaining member 10 enhances the adhesion between the supporting and retaining member 10 and the birdseed member 50. However, different kinds of surface profilings can also be used to enhance adhesion.

In a further embodiment (FIGS. 18 to 20) the supporting and retaining member is dish-shaped. The dish-shaped member 90 consists of a flat supporting surface 91 with a circularly extending edge 92. The birdseed member 50 is then inserted and glued into the dish-shaped member 90, which has adjacent its upper edge a hook-shaped or eyelet-shaped suspension device 95 (FIGS. 18 and 19).

To reinforce the blank 11 of the supporting and retaining member 10 when the latter is flat, the blank 181 can be connected to a reinforcing strip 96 extending in the longitudinal direction of the blank. This gives the flat blank 11 increased stability. Attached to the upper edge of the reinforcing strip 96 is an eyelet-like suspension device 97 consisting of a wire eyelet which is also glued to the reinforcing strip 96 and therefore enables the bird-feeding member to be suspended from the cage (FIG. 21).

The supporting and retaining member 10 can be used not only for advertising purposes, but also for product information.

The bird-feeding members thus designed are suitable for attachment to cages, but they can also be used in the open air.

Figures 22, 23:
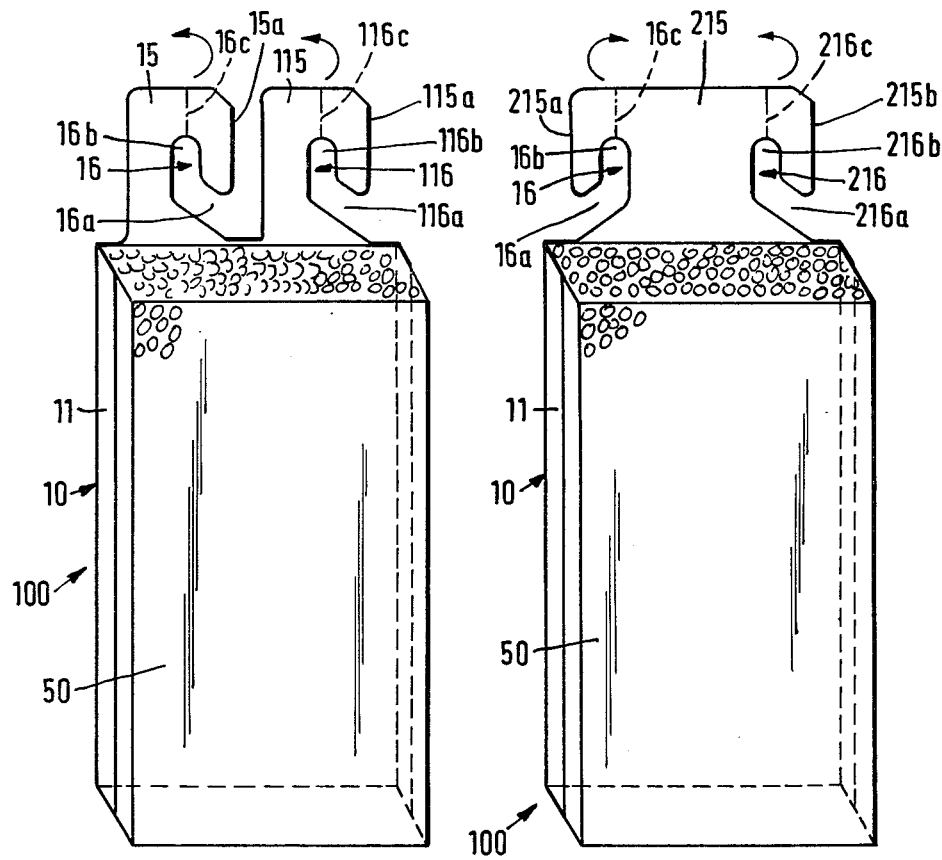
FIG. 22 illustrates diagrammatically a bird-feeding member comprising a strip-shaped cardboard blank with two straps formed on one side and bearing latching eyelets, a birdseed member being disposed on the cardboard blank.
FIG. 23 illustrates diagrammatically a further embodiment of a bird-feeding member comprising a strip-shaped cardboard blank having one strap formed on one side and bearing two latching eyelets.
Figure 24:
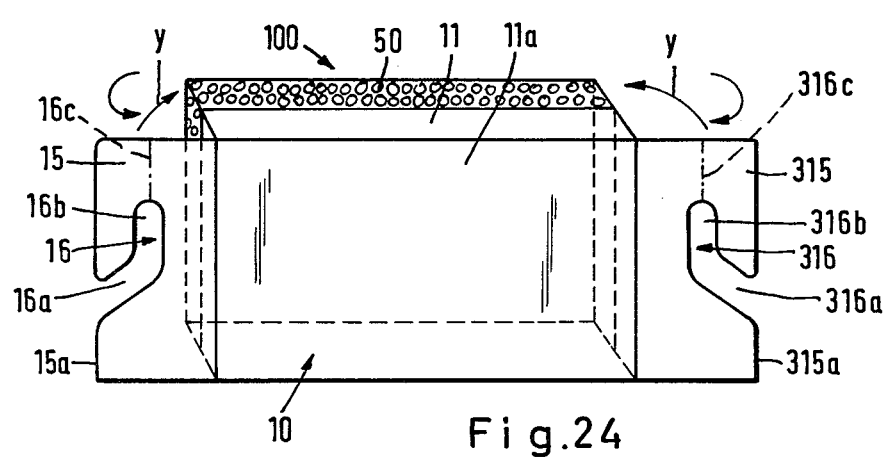
FIG. 24 illustrates diagrammatically a bird-feeding member comprising a strip-shaped cardboard blank with two straps folded onto opposite sides of the cardboard blank and having latching eyelets.

To ensure the satisfactory, secure suspension of the bird-feeding member in a bird cage, that strap-shaped portion of the blank which is free from the birdseed member has two latching eyelets (FIGS. 22, 23 and 24).

In the embodiment of a bird-feeding member illustrated in FIG. 22, the blank 11 of the supporting and retaining member 10 has on one end side two strap-shaped portions 15, 115 disposed one beside the other, of which each portion has a latching eyelet 16; 116. The two latching eyelets 16, 116 are formed by slot-shaped portions 16a, 116a which extend parallel with one another and at an angle in the direction of the free strap ends from the lateral edges 15a, 115a of the straps 15, 115 about as far as the strap longitudinal centre, and by slot-shaped portions 16b, 116b which join the portions 16a, 116a and extend parallel with one another in the centre of the strap upwards in the direction of the free strap ends. The introduction openings of the two latching eyelets 16, 116 are disposed in the same direction on one side of the bird-feeding member, so that a bird-feeding member thus constructed can be latched into the bird cage by the two latching eyelets being slid by their lower introduction openings of the slot-shaped portions 16a, 116a onto a bird cage bar extending parallel. The attachment of the bird-feeding member is further facilitated by the hook-shaped portions of the latching eyelets 16, 116 being downwardly foldable in a manner which enables the bar of the bird cage to be introduced readily into the lateral openings of the latching eyelets 16, 116. For the downward folding of the hook-shaped portions of the latching eyelets 16, 116 each strap 15, 115 has a folding line 16c; 116c which extends from a vertical slot-shaped portion 16b; 116b to the free end of the strap 15; 115 (FIG. 22).

The latching eyelets 16, 116 in the bird-feeding member illustrated in FIG. 24 can however also be so constructed that the introduction openings of the slot-shaped portions come to lie on the other side of the longitudinal edges of the straps 15; 115.

The blank 11 of the supporting and retaining member 10 in the embodiment of a bird-feeding member illustrated in FIG. 23 has only one strap-shaped portion 215, which is formed on in the upper zone of the blank 11 and has two latching eyelets 16, 216.

Of the two latching eyelets 16, 216 the latching eyelet 16 is formed by a slot-shaped portion 16a extending from the lateral edge 215a of the strap 215 at an inclination in the direction of the free strap end, and by a portion 16b which adjoins the portion 16a and extends upwards in the direction of the free strap end, while the other latching eyelet 216 has the opposite construction. The latching eyelet 216 is formed by a slot-shaped portion 216a extending from the other lateral edge 215b of the strap 215 at an inclination in the direction of the free strap end, and by a portion 216b which adjoins the portion 216a and extends upwards in the direction of the free strap end, so that two latching eyelets 16, 216 are formed whose introduction openings come to lie on the outer longitudinal edges of the strap 215. In this embodiment also the hook-shaped portion of the latching eyelets 16, 216 can be hinged downwards by means of folding lines 16c, 216c, so that the bird-feeding member can be readily attached to the bars of a bird cage.

In the embodiment of a bird-feeding member illustrated in FIG. 24 the blank 11 of the supporting and retaining member 10 has on both sides a substantially rectangular strap-shaped portion 15, 315, each portion having a latching eyelet 16, 316. The latching eyelet 16 is formed by a slot-shaped portion 16a which extends from the lateral edge 15a, extending transversely of the supporting and retaining member longitudinal axis, of the free end of the strap 15 upwards at an inclination to the strap narrow side, and by a portion 16b which adjoins the portion 16a and extends upwards in the direction of the strap narrow side, the other latching eyelet 316 being formed by a slot-shaped portion 316 extending from the lateral edge 315a, extending transversely of the supporting and retaining member longitudinal axis, upwards at an angle to the strap narrow side, and by a portion 316b which adjoins the portion 316a and extends upwards in the direction of the strap narrow side. A bird-feeding member 100 constructed in this way therefore has latching eyelets 16, 316 on two opposite sides so that it can be attached to a horizontally extending rod of the bird cage. In this embodiment the two straps 15, 315 having the latching eyelets 16, 316 are connected via folding portions to the surface forming the rear wall 11a of the blank 11, so that the straps 15, 315 can be folded onto the sidewall surface of the bird-feeding member 50. In this way the bird-feeding member is protected against damage during transportation by straps 15, 315 folded laterally onto the bird-feeding member 50. Folding lines 16c, 116c enable the hook-shaped portions of the two latching eyelets 16, 316 to be folded downwards to facilitate the latching on of the bird-feeding member.

The straps 15, 115 with the latching eyelets 16, 116 and the strap 215 with the two latching eyelets 16, 216 can be disposed on one end side but also on both sides of the blank 11 of the bird-feeding member.

The strap-like portions with the latching eyelets 16, 116; 16, 216; 16, 316 are unitary with the blank 11 and are made of the same material from which the blank 11 is made.

As a result of the construction of a bird-feeding member illustrated in FIGS. 22 to 24 and disclosed hereinbefore, each bird-feeding member has two latching eyelets or hook-shaped portions by means of which the bird-feeding member can be latched into bird cages. The feature that in the embodiments illustrated in FIGS. 22 and 23 the bird-feeding member has at one of its two ends two latching eyelets enables even large bird-feeding members to be securely attached to the bars of the bird cage. This makes it possible to attach the bird-feeding member to pairs of bars of the cage; more particularly that embodiment of the invention is advantageous in which the insertion slots of the latching eyelets are provided on opposite lateral edges of the strap receiving the latching eyelets. This construction affords the advantage that after the bird-feeding member has been latched on, it cannot become unlatched again even by the bird-feeding member being pushed to one side.

The embodiment illustrated in FIG. 24, in which the bird-feeding member has a latching eyelet on both its narrow sides is advantageous, since as a result the birdseed member can be latched onto horizontally extending bars of the sidewall of a bird cage. This arrangement of the bird-feeding member enables birdseed to be made available over a wide surface, so that a number of birds can simultaneously peck seeds off the bird-feeding member. Also advantageously the unprotected sidewall surfaces of the bird-feeding member can be protected by folding the straps onto such sidewall surfaces. The arrangement and construction of latching eyelets on two opposite sides of the bird-feeding member affords the further advantage that when seeds have been pecked off the upper part of the bird-feeding member, it can be turned round through 180° and latched again in the area where the bird stands, from which it can remove the seeds.

We claim:

1. A bird-feeding member comprising a supporting and retaining member and a quantity of birdseed which is retained thereon and held together by a bonding agent, means for attaching said bird-feeding member into the bars of a birdcage wherein the bird-feeding member comprises a supporting and retaining member of an elongated strip-shaped blank with a first end and a second end spaced apart in the elongated direction thereof with said first end being T-shaped, said blank having a first folding line extending between the first and second ends and dividing said blank into co-extensive elongated first and second parts, said second part having a second folding line extending from said second end toward and spaced from said first end, said second folding line dividing said second part into elongated co-extensive first and second sub-parts with said first sub-part extending between said first and second folding lines and said second sub-part spaced from said first folding line by said first sub-part, said first sub-part is folded over along said first folding line into contact with said first part and said second sub-part is folded along said second folding line so that it extends perpendicularly to said first sub-part and said first part forming a web extending in the elongated direction of said blank and spaced inwardly from the edges of said first part extending in the elongated direction thereof, a block-like birdseed member being retained on a contact surface formed by said first part and said first sub-part of said supporting and retaining member by means of the bonding agent holding the seeds together with said web formed by said second sub-part extending into said birdseed member, said block-like birdseed member having a first surface in contact with said supporting and retaining member, a second surface opposite said first surface and facing outwardly from said supporting and retaining member, and side surfaces extending between said first and second surfaces, said web formed by said second sub-part extending outwardly from said first sub-part for a dimension equal approximately to half the dimension of said birdseed member between said first and second surfaces thereof, at least one web reinforcing and support strap secured to said web formed by said second sub-part along said second folding line and with said web extending perpendicularly to said first part said web reinforcing and support strap extends from said web into contact with said first part of said supporting and retaining member, and said block-like birdseed member has a first end spaced in the elongated direction of said blank from the first end thereof and a second end adjacent the second end of said blank so that each of said first and second parts of said blank has a portion extending in the elongated direction of said blank between said birdseed member and said first end of said blank which is free of said birdseed member, said means for attaching comprises each of said first and second parts having a separate slot-shaping latching eyelet which is formed by a first slot-shaped portion extending at an oblique angle to said first and second folding lines and toward said first end of said blank from the lateral edge of the corresponding one of said first and second parts extending in the elongated direction thereof and a second slot-shaped portion extending from said first slot-shaped portion in the corresponding one of said first and second parts toward the first end of said blank with said second slot-shaped portion centreed in the corresponding one of said first and second parts and disposed in generally parallel relation with the elongated direction of said blank, and the end of said second slot-shaped portion spaced from said first slot-shaped portion being spaced from the first end of said blank.

2. A bird-feeding member according to claim 1, wherein the birdseed member has a width transverse to the elongated direction of said blank corresponding to the dimension of said first part extending transversely of the elongated direction of the blank.

3. A bird-feeding member according to claim 1, wherein said blank of the supporting and retaining member having an outer wall surface opposite said contact surface supporting said birdseed member, and a strip-shaped temperature-indicating device indicating a particular temperature by a change in colour mounted on said outer wall surface.

4. A bird-feeding member according to claim 1, wherein said blank of the supporting and retaining member having an outer wall surface opposite said contact surface supporting said birdseed member, and a mirror surface mounted on said outer wall surface.

5. A bird-feeding member according to claim 1, wherein said blank has an outer wall surface opposite said contact surface supporting said birdseed member, and said outer wall surface has a coating of a self-adhesive agent which is covered by a pull-off protective sheet.

6. A bird-feeding member according to claim 1, wherein said blank of the supporting and retaining member having an outer wall surface opposite said contact surface supporting said birdseed member which is connected to a reinforcing strip extending in the elongated direction of the supporting and retaining member.

* * * * *